United States Patent Office 3,488,146
Patented Jan. 6, 1970

3,488,146
METHOD FOR PREPARING CRYSTALLINE ALUMINOSILICATES OF IMPROVED STABILITY
Luther J. Reid, Jr., Audubon, N.J., assignor to Mobil Oil Corporation, a corporation of New York
No Drawing. Filed Sept. 1, 1967, Ser. No. 664,901
Int. Cl. C01b 33/28, 33/00
U.S. Cl. 23—112                    5 Claims

ABSTRACT OF THE DISCLOSURE

The invention concern the production of a crystalline aluminosilicate of improved stability by a process comprising the subjection of an ammonium crystalline aluminosilicate, characterized by a silica to alumina mol ratio of at least 3, to a base exchange treatment with a solution of a weak acid thereby converting said crystalline aluminosilicate to its acid form. Such acid or hydrogen form crystalline aluminosilicate has been found to be extremely stable to calcination.

BACKGROUND OF THE INVENTION

Field of the invention

This invention relates to a method of preparing a crystalline aluminosilicate, and more particularly to a method of preparing a hydrogen crystalline aluminosilicate of improved stability.

Description of the prior art

Zeolitic materials, both natural and synthetic, have been demonstrated in the past to have catalytic capabilities for various types of hydrocarbon conversion. Certain zeolitic materials are ordered, porous crystalline aluminosilicates having a definite crystalline structure within which there are a large number of small cavities which are interconnected by a number of still smaller channels. These cavities and channels are precisely uniform in size. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves include a wide variety of positive ion-containing crystalline aluminosilicates, both natural and synthetic. These aluminosilicates can be described as a rigid three-dimensional network of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example, an alkali metal or an alkaline earth metal cation. This can be expressed by formula wherein the ratio of Al to the number of the various cations, such as Ca/2, Sr/2, Na, K, or Li, is equal to unity. One type of cation has been exchanged either in entirety or partially by another type of cation utilizing ion exchange techniques in a conventional manner. By means of such cation exchange, it has been possible to vary the size of the pores in the given aluminosilicate by suitable selection of the particular cation. The spaces between the tetrahedra are occupied by molecules of water prior to dehydration.

Prior art techniques have resulted in the formation of a great variety of synthetic crystalline aluminosilicates. These aluminosilicates have come to be designated by letter or other convenient symbol, as illustrated by zeolite A (U.S. 2,882,243), zeolite X (U.S. 2,822,244), zeolite Y (U.S. 3,130,007), zeolite K–G (U.S. 3,055,654), and zeolite ZK–5 (U.S. 3,247,195), merely to name a few.

To form a hydrogen zeolite Y (HY), for example, it has been heretofore considered necessary to exchange the sodium form of zeolite Y (NaY) with ammonium ions, and thereafter calcining the resultant ammonium zeolite Y ($NH_4Y$) to produce the desired product.

While a more direct route would be to exchange NaY into aquated HY by acid exchange, followed by calcination, this route has been found to be unsuitable and thus is avoided since the product that is produced is unstable to calcination.

SUMMARY OF THE INVENTION

Accordingly, it is among one of the principal objectives of this invention to provide a method for making a stable hydrogen crystalline alminosilicate by exchange of an aluminosilicate starting material with an acid solution.

The method of the invention comprises the subjecting of an ammonium crystalline aluminosilicate, characterized by a silica to alumina mol ratio of at least 3, to a base exchange treatment with an aqueous solution of a weak acid, and thereafter calcining the resulting product to produce a hydrogen crystalline aluminosilicate of improved stability.

DESCRIPTION OF THE PREFERRED EMBODIMENTS

Essentially the invention comprises subjecting to base exchange with a solution of a weak acid an ammonium salt of a crystalline aluminosilicate to produce an acid form of the aluminosilicate, which acid form is characterized by improved stability to heating in air.

The method of the invention is applicable to either natural or synthetic zeolites, characterized by a silica to alumina mol ratio of at least 3. This, of course, includes the particularly preferred zeolitic materials, such as faujasite and zeolite Y. Also preferred are those zeolites havning a silica to alumina mol ratio between about 4 and 8.

The weak acid is one weaker than acetic acid, preferably exhibiting an acidity constant, $pK_a$, of more than 4.8. Illustrative of these weak acids, with their acidity constants, are carbonic 6.37 and 10.25, dichlorophenol 7.44, hypochlorous 7.53, telluric 7.68 and 11.29, chlorophenol 8–9, boric 9.14, 12.74 and 13.80, hydrocyanic 9.31, phenol 9.89, m-cresol 10.01, p-cresol 10.17, o-cresol 10.20, and the like. Where two or more acidity constants appear, the first is that of the first dissociated hydrogen, and the second is that of the second hydrogen, and so forth.

The pH of the solution of weak acid is about 3.6 or higher, preferably between 3.6 and 4.6. The duration of the base exchange is at least long enough to reduce the concentration of removable cations whether sodium, ammonium or calcium, etc., in the zeolite to no more than about 6% by weight, and preferably no more than about 3% by weight. It will be understood that one or more than one exchange steps may be employed. At the conclusion of the base exchange, the material comprises an aquated hydrogen or acid form of aluminosilicate. It is washed thoroughly with water, and dried, preferably at 200–300° F. for 10 to 20 hours in dry air. The material is then subjected to calcining (decomposing any remaining ammonium cations, if present, to hydrogen ions), in order to convert the resulting aquated acid aluminosilicate to the stable anhydrous acid aluminosilicate.

Calcining comprises heating the aquated zeolite in dry air, preferably at intermittently increasing temperatures ranging up to 1300° F. A suitable heating schedule comprises heating for ½ hour at each of the following temperatures: 250, 350, 450, 650, 900 and 1300° F. in the presence of dry air comprises a severe treatment, the resulting product remains stable.

It is contemplated that besides an atmosphere of dry air in the calcining step, there may also be employed a humid atmosphere or a steam atmosphere, also resulting in an acid aluminosilicate of high stability.

As produced according to the method of the invention, the acid aluminosilicate is more stable than the aluminosilicate salt from which it is prepared. Thus, illustrated in the table below, the acid or hydrogen aluminosilicate materials prepared are each more stable than the starting ammonium aluminosilicate, as shown by the water absorption values after repeated calcining.

The improved hydrogen aluminosilicates are suitable for use in hydrocarbon conversions and other reactions.

comprising aquated hydrogen Y, was calcined in a thin layer (about ⅛" thick) in a muffle furnace, using an atmosphere of air. The material was heated for ½ hour at each of the following temperatures: 250, 350, 450, 650, 900 and 1300° F. The calcined materials were then rehydrated with water and were allowed to stand in hydrated condition at ambient temperature for 13 days. X-ray crystallinities were measured, and then the materials were again calcined in the same way as described above.

The results of the X-ray analyses and of water adsorption tests are listed in the following table, together with the pH of the base exchange solution. Also listed are the properties of the starting ammonium aluminosilicate after similar calcination treatment.

TABLE

| No. | Weak acid exchange solution (2 wt. percent) | Measured pH of solution | Water adsorption, g./100 g. | |
|---|---|---|---|---|
| | | | After 1st calcination | After 2nd calcination |
| Example 1 | Boric Acid ($H_3BO_4$) | 4.2 | 26.9 | 23.7 |
| Example 2 | Phenol ($C_6H_5OH$) | 3.6 | 26.6 | 26.6 |
| Starting material | $NH_4Y$ (not exchanged) | | 23.1 | 17.1 |

They may be used as is or after further ion exchange. Generally, they are subjected to base exchange to replace at least a part of their hydrogen ions by a desired cation, including at least one cation of a metal of Groups I to VIII. Particularly suitable cations are those of rare earth metals as set forth in Patents 3,210,267 and 3,257,310, in which are also described suitable methods for exchanging the metals into the hydrogen aluminosilicates. After the base exchange step, the material may be suspended in a suitable matrix, such as silica-alumina, to provide, after washing and drying, a finished catalyst. It is also feasible to disperse the hydrogen aluminosilicate in the matrix and then to perform the base exchange. Many suitable matrices and procedures for incorporating them in the catalyst are described in the last-mentioned patents.

The finished catalyst is distinctive by reason of its resistance to repeated calcining treatments, i.e., despite such treatments it retains a high level of catalytic activity.

The invention may be illustrated by the following examples.

Examples 1 and 2

Sodium Y, having a silica:alumina ratio of 5.9, and a cyclohexane adsorption capacity of 20.2 g. per 100 g. of zeolite, was base exchanged with a 10% by weight aqueous ammonium chloride solution to replace sodium cations by ammonium cations. The product was washed and then dried overnight at 250° F. It contained 1.3% by weight Na.

The ammonium Y material was taken for further experiments. In one experiment, serving as Example 1, 6 g. of ammonium Y was base exchanged at ambient temperature with two liters of a solution containing 2% by weight of boric acid ($H_3BO_4$). The acidity constant, $pK_a$, of boric acid is 9.14 for the first hydrogen, 12.74 for the second, and 13.80 for the third. The flow rate of the solution through the zeolite was adjusted to provide a total contact time of 1 hour. In a second experiment, serving as Example 2, the base exchange solution was phenol, all of the conditions being the same as described. The acidity constant of phenol is 9.89.

In each case the resulting base exchanged product,

It may be seen that the products of Examples 1 and 2 are surprisingly of exceedingly higher stability than the original ammonium zeolite starting material (i.e. conventional calcining to decompose the ammonium ions to the acid form) as evidenced by the water adsorption values after the first and second calcination.

It will be understood that the above description is merely illustrative of preferred embodiments of the invention. Additional modifications and improvements utilizing the discoveries of the present invention can be readily anticipated by those skilled in the art from the present disclosure, and such modifications and improvements may fairly be presumed to be within the scope and purview of the invention as defined by the claims that follow.

What is claimed is:

1. A method for making a stable hydrogen crystalline aluminosilicate which comprises subjecting an ammonium crystalline aluminosilicate, characterized by a silica to alumina mol ratio of at least 3, to a base exchange treatment with an aqueous solution of a weak acid having a pH of at least 3.6, said acid having a $pK_a$ of at least about 4.8, and thereafter calcining the resulting product.

2. A method according to claim 1 wherein said crystalline aluminosilicate is zeolite Y.

3. A method according to claim 2 wherein said pH is between about 3.6 and 4.6.

4. A method according to claim 1 wherein said acid is boric acid.

5. A method according to claim 1 wherein said acid is phenol.

References Cited

UNITED STATES PATENTS

| 3,130,006 | 4/1964 | Rabo et al. | 23—111 X |
| 3,293,192 | 12/1966 | Maher et al. | 23—111 X |
| 3,364,135 | 1/1968 | Hansford | 252—455 X |
| 3,375,064 | 3/1968 | Miale et al. | 23—111 |
| 3,383,169 | 5/1968 | Young | 23—112 |

EDWARD J. MEROS, Primary Examiner

PO-1050
(5/63)

UNITED STATES PATENT OFFICE
CERTIFICATE OF CORRECTION

Patent No. 3,488,146      Dated January 6, 1970

Inventor(s) Luther J. Reid, Jr.

It is certified that error appears in the above-identified patent and that said Letters Patent are hereby corrected as shown below:

Column 1, line 71, "(U.S. 2,822,244)" should be --(U.S. 2,882,244)--

SIGNED AND
SEALED
JUL 14 1970

(SEAL)
Attest:

Edward M. Fletcher, Jr.
Attesting Officer

WILLIAM E. SCHUYLER, JR.
Commissioner of Patents